United States Patent [19]

Takeda et al.

[11] Patent Number: 4,910,858

[45] Date of Patent: Mar. 27, 1990

[54] AUTOMATIC COIL WINDING AND FINISHING MACHINE

[75] Inventors: Kyoji Takeda; Katsuhiko Takeda; Shuji Takeda, all of Tokyo, Japan

[73] Assignee: Tanaka Seiki Co., Ltd., Tokyo, Japan

[21] Appl. No.: 288,246

[22] Filed: Dec. 22, 1988

[30] Foreign Application Priority Data

Jan. 29, 1988 [JP] Japan .................................. 63-18952
Jan. 29, 1988 [JP] Japan .................................. 63-18953

[51] Int. Cl.[4] .............................................. B23Q 41/02

[52] U.S. Cl. ........................................ 29/563; 29/564; 29/33 F; 29/33 P; 198/468.2; 198/468.6; 198/468.01; 198/409; 198/429

[58] Field of Search .............. 29/563, 564, 33 F, 33 P, 29/605; 198/468.2, 468.6, 468.01, 409, 429

[56] References Cited

U.S. PATENT DOCUMENTS 4,035,904 7/1977 Ishizaka et al. ........................ 29/563
4,790,063 12/1988 Kawazoe .............................. 29/605
4,823,459 4/1989 Takeda ................................ 29/33 P

*Primary Examiner*—P. W. Echols
*Attorney, Agent, or Firm*—Spencer & Frank

[57] ABSTRACT

An automatic coil winding and finishing machine. First and second bobbin conveying devices of the apparatus are capable of reciprocating on linear lines while holding coil bobbins, and of stopping the coil bobbins at predetermined positions. The first conveying devices allow the coil bobbins to be fed from a feeding device to a coil winding device and then to be discharged therefrom after the completion of the coil winding process. The second conveying device receives the coil bobbins from the first conveying device, and then allows them to be subjected to coil finishing processes in cooperation with devices for the coil finishing processes, as the coil bobbins remain held by the second conveying device. The intervals at which the conveying devices hold the coil bobbins may be determined in such a manner that the intervals are reduced when the coil bobbins are transformed from the first conveying device to the second conveying device.

3 Claims, 10 Drawing Sheets

AUTOMATIC COIL WINDING AND FINISHING MACHINE

BACKGROUND OF THE INVENTION

The present invention relates to an automatic coil winding and finishing machine which continuously and automatically performs processes such as a coil winding process, a coil-end temporary fixing process, a terminal soldering process, a conduction checking process, and a defective discriminating process, after coil bobbins have been fed into the system and before the coil bobbins are discharged therefrom.

Processes such as those described above have hitherto been performed in the following manner: while the coil winding process and the various coil finishing processes are performed by individual devices, the mounting of coil bobbins onto the coil winding device, the dismounting of the coil bobbins after the completion of the coil winding process, and the mounting and the dismounting of the coil bobbins onto and from the individual coil finishing devices are performed by the operators or by exclusive machines. In addition, belt conveyors are often used to convey the coil bobbins between the coil winding device and the group of coil finishing devices.

In recent years, the coil winding process and the coil finishing processes have been automatized. Some processing systems employ exclusive machines to feed and discharge coil bobbins into and from various devices to which those processes are allotted.

Further, some processing systems have their devices for coil finishing processes arranged according to designs directed to the reduction of the area exclusively required for the finishing of coils.

With the known arrangements of the coil-processing systems, however, problems are encountered. Because a bobbin conveying device, such as a belt conveyor, is required to convey coil bobbins on which coils have been formed thereon by the coil winding machine to a location where the first coil finishing process is to be performed, and because exclusive machines are necessary to feed and discharge coil bobbins into and from the coil winding machine and the coil finishing devices, the area required is inevitably large, and considerable time is consumed by the feeding and discharging of the coil bobbins.

An object of the present invention is to overcome the above-stated problems of the conventional machines, and to provide an automatic coil winding and finishing machine, which comprises two bobbin conveying devices (hereinafter referred to as "shuttles") capable of reciprocating on linear lines while holding coil bobbins and capable of stopping the coil bobbins at predetermined positions, whereby the coil bobbins are fed into and discharged from the coil winding device, and the bobbins remaining held by one of the shuttles are subjected to coil finishing processes in cooperation with the devices for the coil finishing processes. Thus, the entire machine requires a much smaller area than the conventional system, and the machine facilitates the layout of the various devices, thereby enabling an improvement in the quality of the product, and a reduction in the time for operation.

Another object of the present invention is to provide an automatic coil winding and finishing machine, in which, when coil bobbins are to be transferred from the shuttle for the coil winding process to the shuttle for the coil finishing processes, the intervals between adjacent coil bobbins are reduced, thereby facilitating the reduction of the size of each of the devices for the coil finishing processes. This arrangement is made in view of the following facts: The intervals at which coil bobbins are held by a shuttle immediately before the coil winding process must be the same as those at which the coil bobbins are held by the spindles that rotate during coil winding operation by the coil winding device. On the other hand, the intervals at which the coil bobbins are held by a shuttle during the coil finishing processes correspond to those which are necessary to perform processes such as the soldering of the terminals of coil bobbins with the coils wound thereon, cleaning, drying, and coil conduction checking. Those intervals, therefore, may be far narrower than those between the spindles of the coil winding device.

SUMMARY OF THE INVENTION

An automatic coil winding and finishing machine according to the present invention comprises two shuttles which are capable of reciprocating on linear lines while holding coil bobbins, and capable of stopping the coil bobbins at predetermined positions and with predetermined attitudes, and which are provided for transferring coil bobbins between a feeding device (hereinafter referred to as a "parts feeder") for feeding coil bobbins, a coil winding device, and devices for coil finishing processes, thus eliminating the use of belt conveyors, which have conventionally been used for the same purpose. Thus, the machine of the present invention comprises: a first shuttle for moving coil bobbins; a parts feeder disposed in parallel with the first shuttle for lining the coil bobbins and then feeding the coil bobbins to the first shuttle; a coil winding device for receiving the coil bobbins from the first shuttle and then winding coils on the coil bobbins; a second shuttle for moving the coil bobbins; devices for coil finishing processes which are disposed in parallel with the second shuttle; and an electronic control device for controlling at least the first shuttle, the second shuttle, the coil winding device, and the devices for the coil finishing processes in such a manner that they operate in synchronization. The parts feeder, the first shuttle, the coil winding device, the second shuttle, and the devices for the coil finishing processes are disposed at positions such that, when the coil bobbins have been fed from the parts feeder to the first shuttle and then moved to a predetermined position on the first shuttle, the coil bobbins are transferred from the first shuttle to the coil winding device; when the coil bobbins have been subjected to the coil winding process, the coil bobbins are again transferred to the first shuttle; when the coil bobbins have been moved to another predetermined position on the first shuttle, the coil bobbins are transferred from the first shuttle to the second shuttle; and, when the coil bobbins have been moved to predetermined positions on the second shuttle, the coil bobbins are subjected to predetermined processes by the devices for the coil finishing processes.

The first shuttle and the second shuttle may each comprise: a mechanism for converting through 90 degrees the attitude of a coil bobbin holding structure (hereinafter referred to as a "finger unit") so that the finger unit can hold the coil bobbins with the central axis of the coil bobbins being switched between the horizontal and vertical directions; a mechanism for moving the finger unit in the horizontal direction normal to the central axis of the coil bobbins held by the finger unit; a mechanism for advancing or retracting the coil bobbins held by the finger unit in the direction of the central axis of the coil bobbins; and a mechanism for discharging the coil bobbins from the finger unit.

Further, the intervals between the bobbin holding pins of the finger unit of the first shuttle and the intervals between the bobbin holding pins of the finger unit of the second shuttle may be determined in such a manner that, when the coil bobbins are transferred from the first shuttle to the second shuttle, the intervals at which the coil bobbins are to be held by the second shuttle are changed with respect to the intervals at which the coil bobbins are held by the first shuttle, so that all the coil bobbins on which the coils are formed can be transferred to the second shuttle by effecting a plurality of transferring operations, each time causing a certain number of coil bobbins among a plurality of groups of coil bobbins held in line by the first shuttle and across a certain span to be transferred.

DESCRIPTION OF THE PREFERRED EMBODIMENTS

The present invention will be explained in detail with reference to the drawings attached.

The illustration of coil bobbin is omitted in FIGS. 1 through 5 to simplify the drawings.

The basic arrangement of the automatic coil winding and finishing machine according to the present invention will be described at first.

Figure 1:
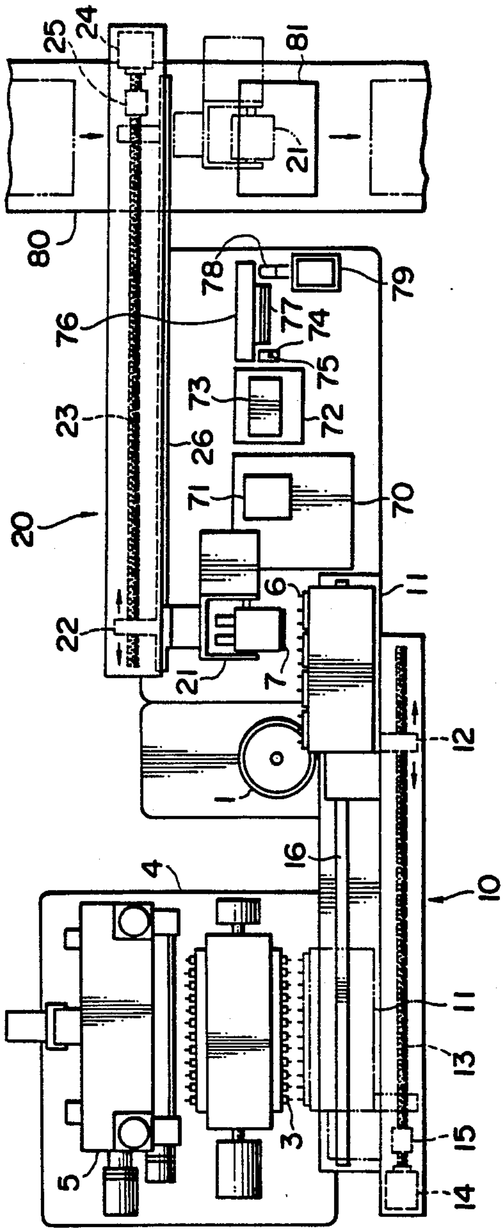
FIG. 1 is a plan view of an embodiment of an automatic coil winding and finishing machine in accordance with the present invention.

As shown in FIG. 1, the coil winding and finishing machine in accordance with the embodiment of the present invention includes a first shuttle 10 on which a first finger unit 11 for holding coil bobbins 2 (FIGS. 6 through 11(*d*)) can be moved horizontally, a parts feeder 1 for feeding the coil bobbins 2 to the first finger unit 11, and the main body of a coil winding device 4 for receiving the coil bobbins 2 from the first finger unit 11 and winding coils on the coil bobbins 2. The parts feeder 1 and the coil winding device 4 are disposed in facing relationship with the first shuttle 10.

The coil winding device 4 has spindles 3 mounted on the main body thereof for allowing the coil bobbins 2 to be rotated thereon to wind the coil on the coil bobbins 2. The device 4 also has a mechanism 5 for simultaneously moving nozzles which guide wires when it is required to wind wires around the coil bobbins 2 mounted on the spindles 3 or to temporarily fix the ends of the coils to the terminals of the coil bobbins 2 after the completion of the coil winding.

The parts feeder 1 has an exit from which the coil bobbins 2 are discharged to be fed to the first shuttle 10. The exit is disposed at a position at which the exit is able to face coil-bobbin holding pins 6 of the finger unit 11 when the first finger unit 11 assumes a downwardly-directed attitude. On the other hand, the spindles 3 of the coil winding device 4 are disposed at a position at which the finger unit 11 assuming a horizontally-directed attitude (indicated by two-dot chain lines in FIG. 1) is allowed to transfer the coil bobbins to the coil winding device 4.

The machine further includes a second shuttle 20 on which a second finger unit 21 holding the coil bobbins 2 can move horizontally. The following devices and a mechanism are disposed in a line in a facing relationship with the second shuttle 20: a soldering device 70 having a solder bath 71 for effecting soldering at the terminals of the coil bobbins 2 with the coils wound thereon; a cleaning device 72 having a cleaning bath 73 containing a cleaning liquid for effecting, after the soldering, the cleaning of the coil bobbins 2 to remove any impurities adhered to them during the soldering; a hot-air blowing device 74 having a hot-air blowout hole 75 through which hot air is blown for effecting drying after the cleaning; a defective discriminating device 76 having a sensor section 77 for effecting tests such as conduction tests on the coils; and a defective discharging mechanism 78 for discharging any defective products to a defective-receiving case 79. The apparatus further has a conveying device 80 for conveying a pallet 81 which receives products completed and arranged in lines.

The solder bath 71, the cleaning bath 73, the hot-air blowout hole 75, and the defective discharging mechanism 78 are all disposed in a line in such a manner as to face the coil bobbins 2 held by the second finger unit 21 when the unit 21 moves while being directed downward.

Next, drive mechanisms for the finger units 11 and 21 will be described. Referring to FIG. 1, a movable plate 12 fixed to the finger unit 11 of the first shuttle 10 has an internal thread engaging with a pole screw 13. When the pole screw 13 is rotated through a shaft coupling 15 by a motor 14, the movable plate 12 is moved horizontally, as indicated by the arrows in the figure, thereby causing the finger unit 11 to be moved horizontally on a linear guide rail 16.

Similarly, a movable plate 22 fixed to the finger unit 21 of the second shuttle 20 has an internal thread engaging with a pole screw 23. When the pole screw 23 is rotated through a shaft coupling 25 by a motor 24, the movable plate 22 is moved horizontally, as indicated by the arrows in the figure, thereby causing the finger unit 21 to be moved horizontally on a linear guide rail 26.

Figure 2:
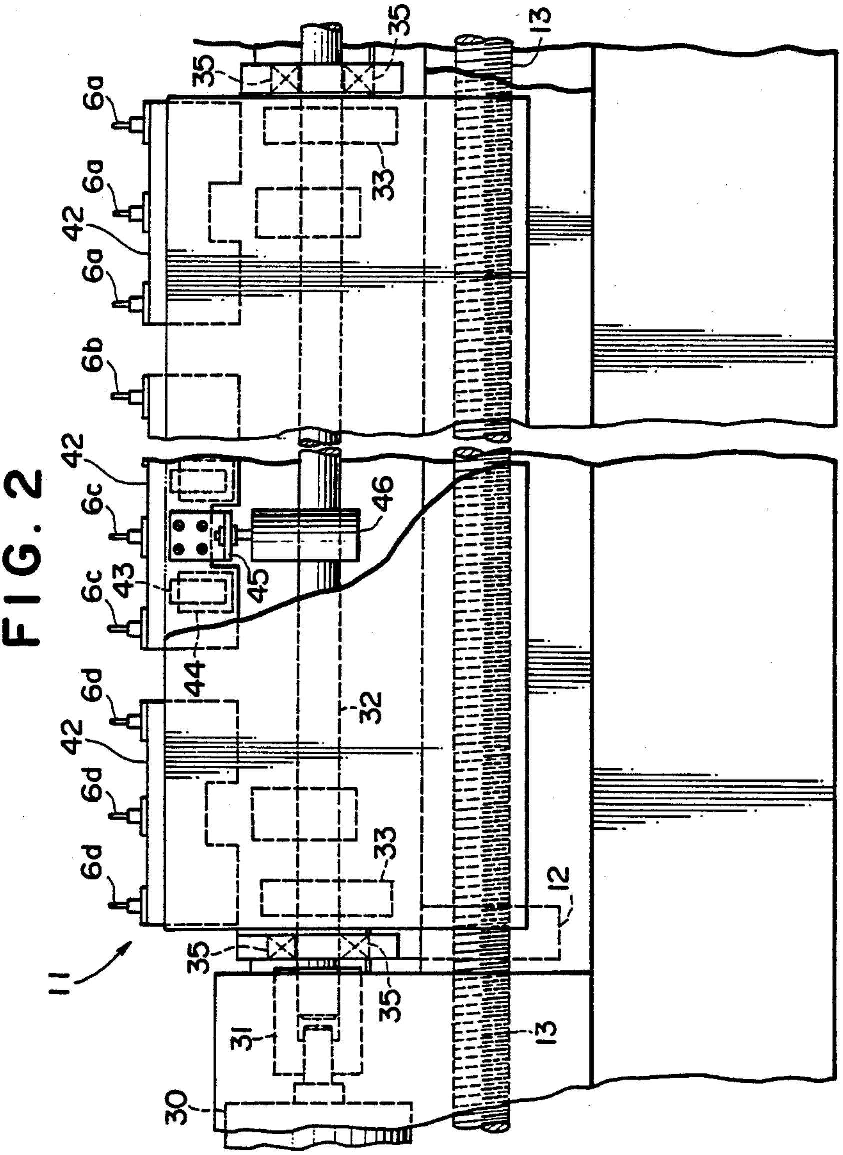
FIG. 2 is a plan view showing essential parts of a first shuttle in the machine shown in FIG. 1.
Figure 3:
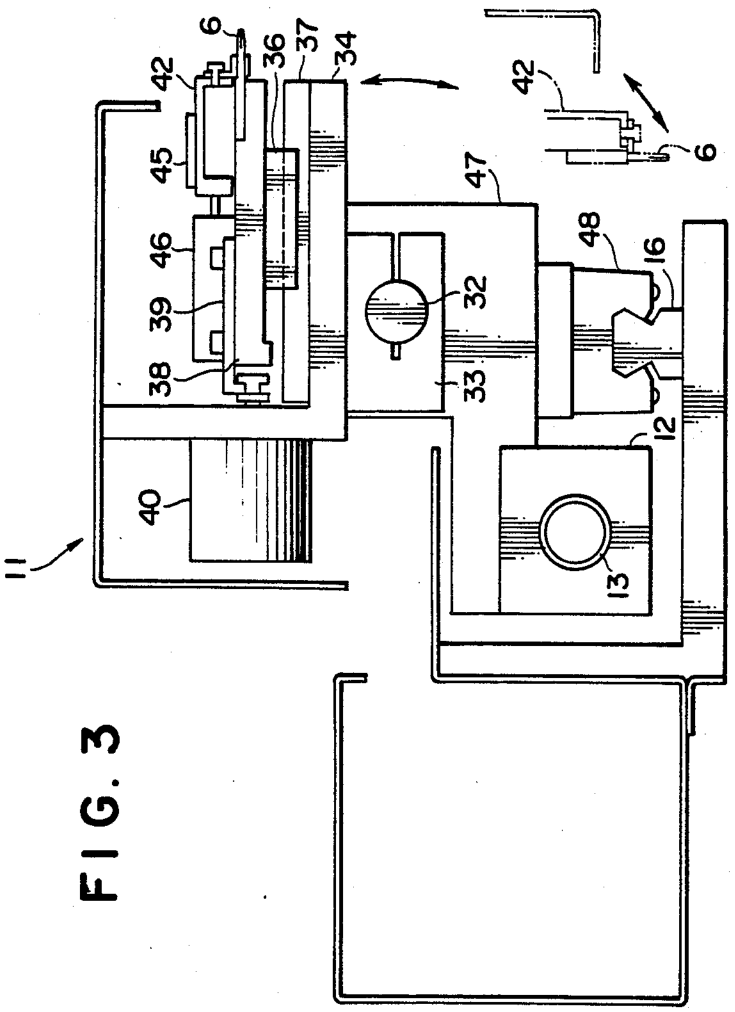
FIG. 3 is a right-hand side sectional view showing essential parts of the first shuttle used in the machine shown in FIG. 1.

As shown in FIGS. 2 and 3, the finger unit 11 of the first shuttle 10 is fixed to a rotary shaft 32 through shaft mounting blocks 33.

The rotary shaft 32 is rotatably supported through ball bearings 35 by a movable support 47 capable of moving horizontally on the linear guide rail 16. The movable support 47 is supported by a linear guide 48 in such a manner as to be movable on the linear guide rail 16.

The rotary shaft 32 is connected to a rotary actuator 30 through a shaft coupling 31. When the rotary actuator 30 is driven, the direction of the pins 6 (comprising pins *6a*, *6b*, *6c*, and *6d*, as shown in FIG. 2) for holding the coil bobbins 2 can be changed by rotating them through 90 degrees from a horizontal direction (indicated by solid lines in FIG. 3) to a downward direction (indicated by two-dot chain lines in FIG. 3). When the pins 6 in the horizontally-directed state hold the coil bobbins, the central axis of the bobbins extends horizontally. When the pins 6 in the downwardly-directed state hold the coil bobbins, the central axis of the bobbins held extends vertically. The direction of the bobbin holding pins 6 can alternatively be changed from the downward direction to the horizontal direction.

Figure 4:
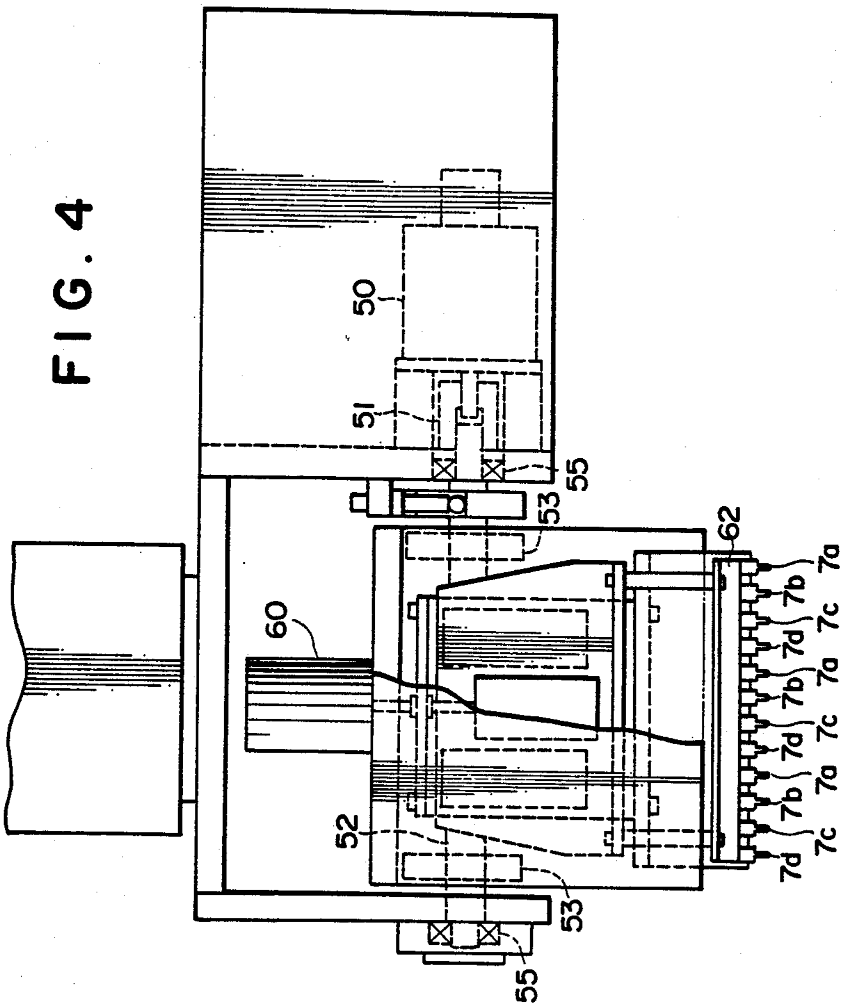
FIG. 4 is a plan view showing essential parts of a second shuttle of the machine shown in FIG. 1.
Figure 5:
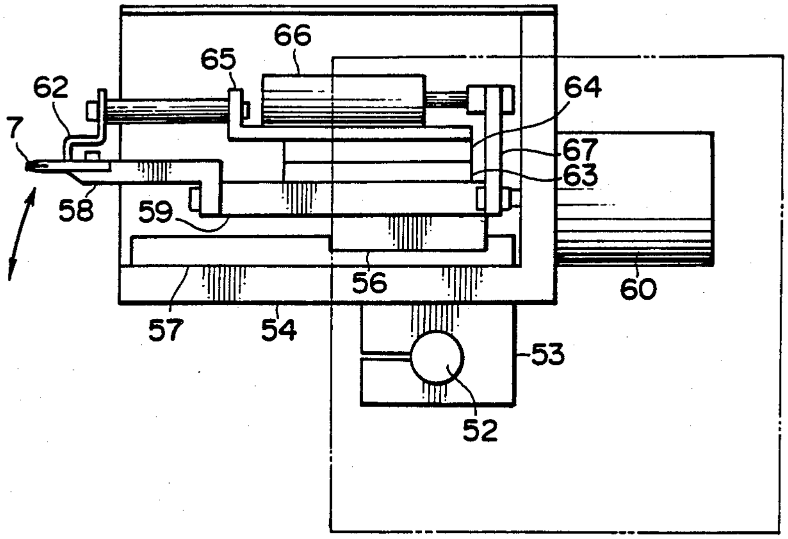
FIG. 5 is a right-hand side sectional view showing essential parts of the second shuttle shown in FIG. 4.
Figure 5:
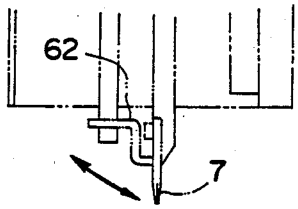

Similarly, as shown in FIGS. 4 and 5, the finger unit 21 of the second shuttle 20 is fixed to a rotary shaft 52 through shaft mounting blocks 53. The rotary shaft 52 is rotatably supported through ball bearings 55 by a movable support, not shown, capable of moving horizontally on the linear guide-rail 26 (FIG. 1).l The rotary shaft 52 is connected to a rotary actuator 50 through a shaft coupling 51. When the rotary actuator 50 is driven, the direction of pins 7 (comprising pins *7a*, *7b*, *7c* and *7d*, as shown in FIG. 4) for holding the coil bobbins 2 can be changed by rotating them through 90 degrees from a horizontal direction (indicated by solid lines in FIG. 5) to a downward direction (indicated by two-dot chain lines in FIG. 5). When the pin 7 in the horizontally-directed state hold coil bobbins, the central axis of the bobbins extends horizontally. When the pins 7 in the downwardly-directed state hold coil bobbins, the central axis of the bobbins held extends vertically. The direction of the bobbin holding pins 7 can alternatively be changed from the downward direction to the horizontal direction.

Next, description will be given concerning the arrangement and operation of a mechanism for advancing or retracting the bobbin holding pins 6 and 7 and bobbin discharging plates 42 and 62, which are mounted on the finger units 11 and 21, respectively.

As shown in FIGS. 2 and 3, the bobbin holding pins 6 are mounted on pin-mounting members 38 which are movable integrally with linear guides 36 that are freely movable on linear guide rails 37 mounted on a finger unit base 34. The pins 6 are replaceable in accordance with the size and the configuration of the coil bobbins to be held by the pins 6. Each pin-mounting member 38 is connected to a movable portion of an air cylinder 40 via a pin-mounting member driving plate 39. The air cylinder 40 is fixed to the finger unit base 34. Therefore, when the air cylinder 40 is operated, the pin-mounting member 38 and, hence, the bobbin holding pins 6 can be advanced or retracted in the direction of the central axis of the coil bobbins held by the pins 6.

Further, as shown in FIGS. 2 and 3, the bobbin discharging plates 42 are each connected to the pin-mounting member 38 via linear guides 44 and linear guide rails 43 in such a manner as to be movable on the linear guide rails 43. Each bobbin discharging plate 42 is also connected to a movable block of a thin air-cylinder 46 via a bobbin discharging plate driving plate 45. The air cylinder 46 is fixed to the pin-mounting member 38. Therefore, when the air cylinder 46 is operated, the bobbin discharging plate 42 can be advanced or retracted relative to the corresponding bobbin holding pins 6.

Similarly, as shown in FIGS. 4 and 5, the bobbin holding pins 7 are mounted on a pin-mounting member 58 which is fixed to a pin-mounting member driving plate 59 movable integrally with linear guides 56 that are freely movable on linear guide rails 57 mounted on a finger unit base 54. The pins 7 are replaceable in accordance with the size and the configuration of the coil bobbins to be held by the pins 7.

The pin-mounting member 58 is connected to a movable portion of an air cylinder 60 via the pin-mounting member driving plate 59. The air cylinder 60 is fixed to the finger unit base 54. Therefore, when the air cylinder 60 is operated, the bobbin holding pins 7 can be advanced or retracted in the direction of the central axis of the coil bobbins held by the pins 7.

Further, as shown in FIGS. 4 and 5, the bobbin discharging plate 62 is connected to the pin-mounting member 58 via linear guides 64 and linear guide rails 63 in such a manner as to be movable on the linear guide rails 63. Further, a thin air-cylinder 66 is fixed to a bobbin discharging plate driving plate 65, and a movable portion of the air cylinder 66 is fixed to a raised portion 67 of the pin-mounting member driving plate 59. Therefore, when the air cylinder 66 is operated, the bobbin discharging plate 62 can be advanced or retracted relative to the bobbin holding pins 7.

Next, the manner in which the coil bobbins 2 are transferred will be described.

Figure 6:
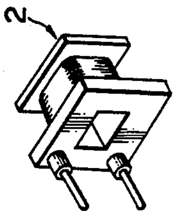
FIG. 6 is a perspective view of an example of a coil bobbin used in the machine, showing the perspective view of the external appearance thereof.

FIG. 6 is a perspective view showing the exterior appearance of each of the coil bobbins 2 shown in FIGS. 7 through 10. Coil bobbins which can be used in the coil winding and finishing machine of the present invention may have various different configurations and sizes other than the one as shown in FIG. 6.

FIGS. 7(*a*), 7(*b*), 7(*c*) and 7(*d*) are sectional views illustrating the state in which coil bobbins 2 are transferred from the finger unit 11 of the first shuttle 10 to the finger unit 21 of the second shuttle 20.

Figure 8:
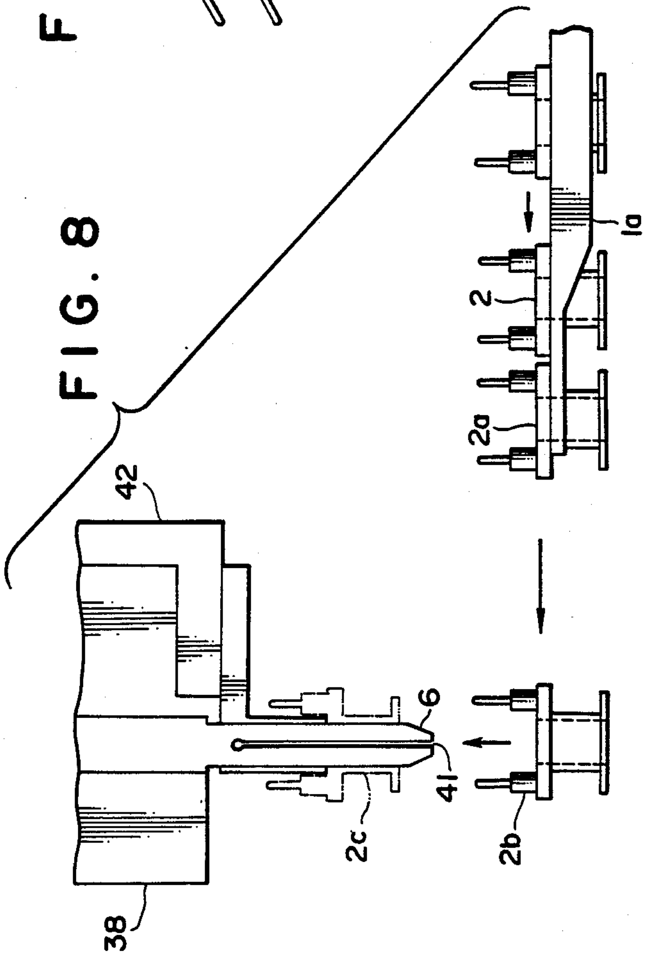
FIG. 8 is a view used to explain the manner in which coil bobbins are fed from a parts feeder to the first shuttle.
Figure 7A:
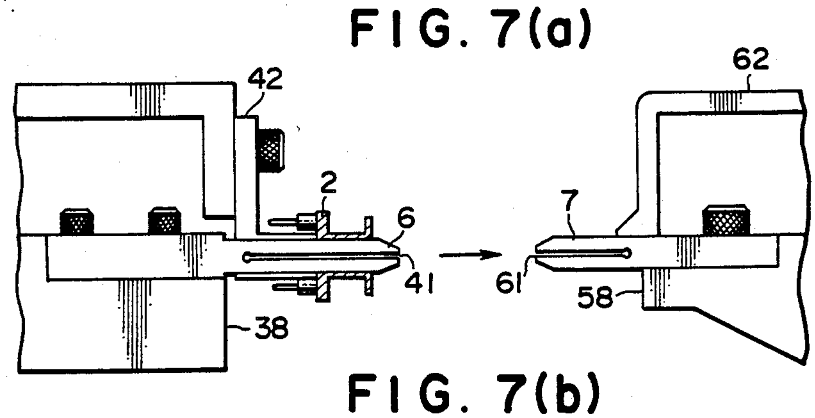
FIGS. 7(*a*), 7(*b*), 7(*c*) and 7(*d*) are views used to explain the manner in which coil bobbins are transferred from the first shuttle to the second shuttle.
Figure 7B:
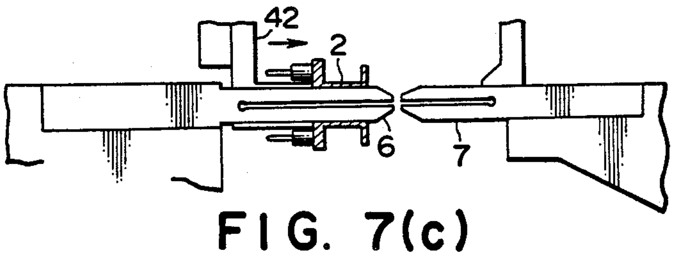
Figure 7C:
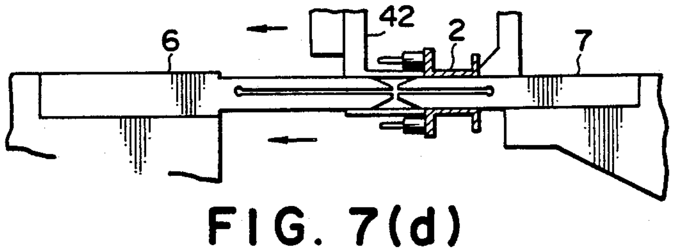
Figure 7D:
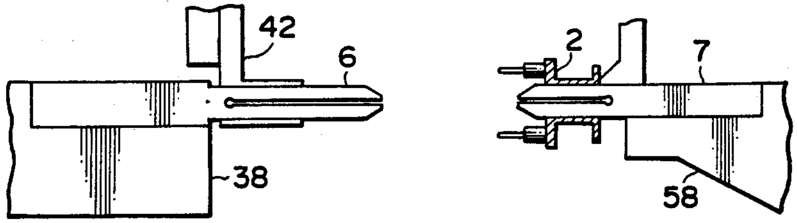

FIG. 8 is a sectional view illustrating the state in which coil bobbins 2 are transferred from the parts feeder 1 to the finger unit 11 of the first shuttle 10 to be held by the unit 11.

Figure 9:
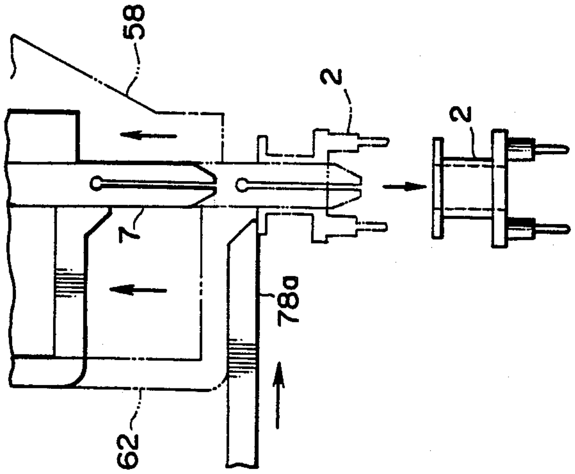
FIG. 9 is a view used to explain the manner in which a defective coil bobbin is discharged from the second shuttle.
Figure 11A:
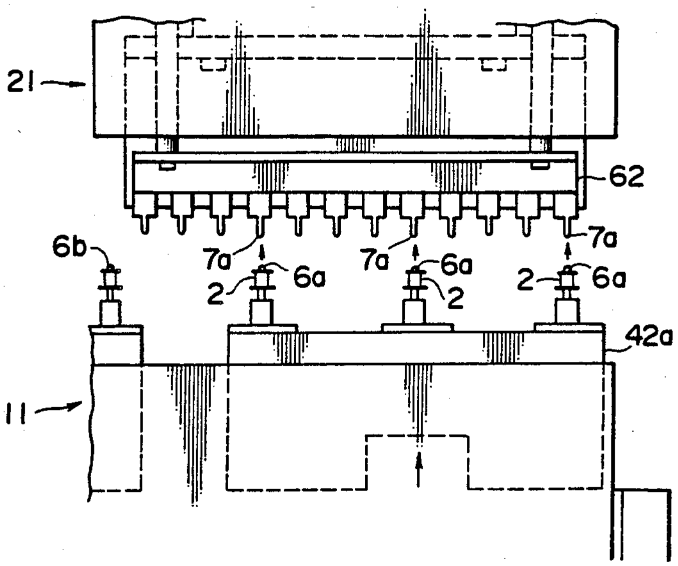
FIGS. 11(*a*), 11(*b*), 11(*c*) and 11(*d*) are views showing the manner in which coil bobbins are transferred from a first shuttle to a second shuttle of the machine in accordance with the present invention.
Figure 11B:
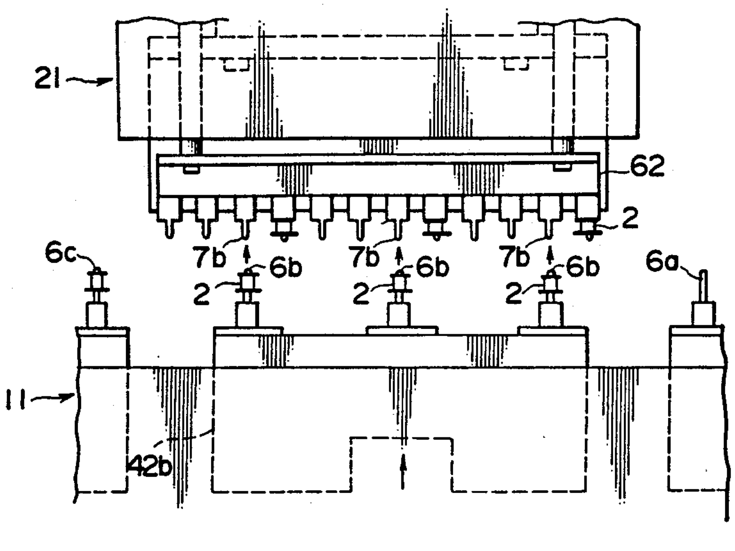
Figure 11C:
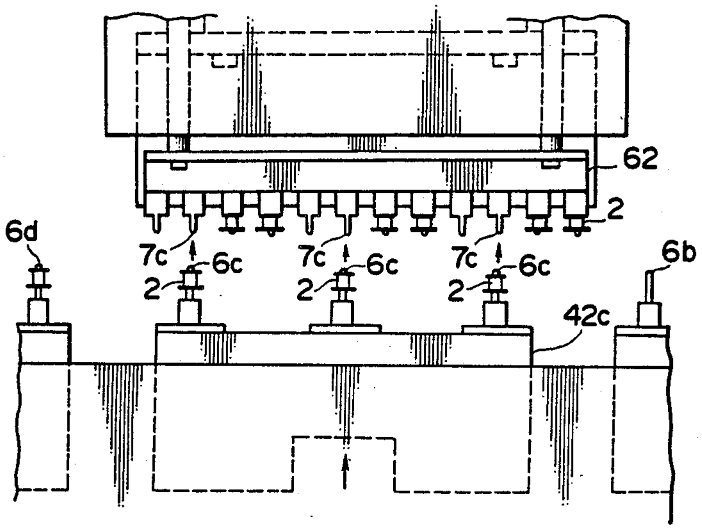
Figure 11D:
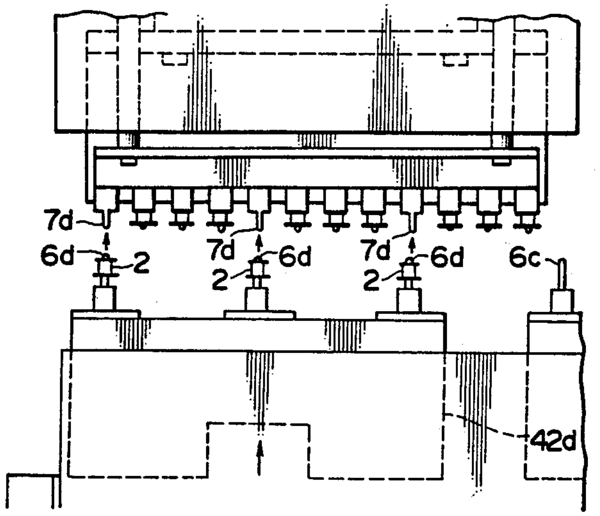

FIG. 9 is a sectional view illustrating the state in which one of the coil bobbins 2 held by the finger unit 21 of the second shuttle 20, which has been determined to be defective during the checking of the coil, is discharged.

Figure 10:
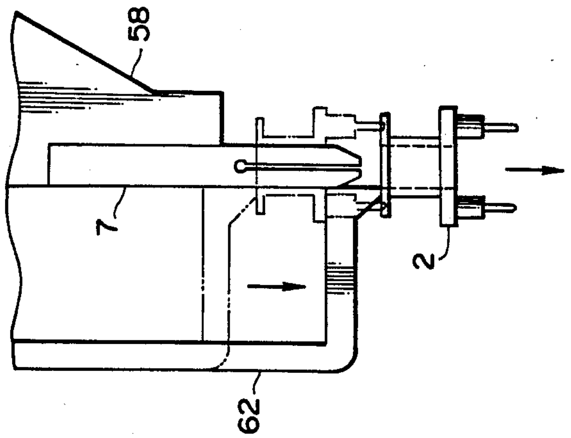
FIG. 10 is a view used to explain the manner in which a coil bobbin is discharged from the second shuttle to a conveying pallet.

FIG. 10 is a sectional view illustrating the state in which a completed coil bobbin 2, which has been subjected to all the processes, is removed and discharged from the finger unit 21 of the second shuttle 20 to be transferred to the conveying pallet 81.

When it is required to cause coil bobbins 2, each being such as shown in FIG. 6, to be held by the bobbin holding pins 6 of the finger unit 11 of the first shuttle 10, the finger unit 11 is directed downward so that the tips of the bobbin holding pins 6 are also directed downward, and the bobbin holding pins 6 are advanced downward, as shown in FIG. 8. Subsequently, the coil bobbin 2 that is at the head of the coil bobbins 2 lined by a bobbin lining bar 1*a*, which is provided at the exit of the parts feeder 1, is held by a fork-shaped holder, not shown, brought from a position 2*a* shown in the figure to a position 2*b*, then moved upward, and finally, at a position 2*c*, fitted around one of the bobbin holding pins 6. Since each bobbin holding pin 6 is formed with an axially extending slit, the pin 6 is able to exhibit resilience which acts to hold the coil bobbin 2 without any risk of the bobbin dropping.

When it is required to transfer the coil bobbins 2 from the finger unit 11 of the first shuttle 10 to the spindles 3 of the coil winding device 4, or when it is required to transfer the coil bobbins 2 from the finger unit 11 of the first shuttle 10 to the finger unit 21 of the second shuttle 20, the coil bobbins 2 are transferred in the manner illustrated in FIGS. 7(*a*) through 7(*d*). The drawings show the case where the finger unit 21 of the second shuttle 20 receives the coil bobbins 2, by way of example.

FIG. 7(*a*) illustrates the state in which the finger unit 11 horizontally holding coil bobbins 2 with coils wound thereon has been moved to the front of the finger unit 21 and is stopped at a position at which the central axis of the bobbin holding pins 6 of the unit 11 exactly alines with the central axis of the bobbin holding pins 7 which are to receive the coil bobbins 2. From this state, the bobbin holding pins 6 and the bobbin discharging plate 42 are simultaneously advanced, thereby bringing the tips of the bobbin holding pins 6 very close to the tips of the bobbin holding pins 7, as shown in FIG. 7(*b*).

Subsequently, as shown in FIG. 7(*c*), bobbin discharging plate 42 alone is advanced, thereby causing the coil bobbins 2 held by the bobbin holding pins 6 to be transferred to and held by the bobbin holding pin 7. Thereafter, the bobbin discharging plate 42 and the bobbin holding pins 6 are retracted, thereby returning them to their initial states. The pins 6 and 7 illustrated in FIGS. 3, 5, and 7 through 10 each have a slit formed therein so as to exhibit resilience and thus to prevent any dropping of the coil bobbins 2 when the pins 6 and 7 are in their downwardly-directed state. However, in the case where the coil bobbins being used are small in size and light-weighted, if the configuration of the pins is suitably changed, the resilience of the inner walls of the bores of the coil bobbins can be utilized to ensure a sufficient prevention against dropping, even if the pins are formed of rigid bodies and have no slits.

When the coil bobbins 2 with the coils formed thereon are held by the finger unit 21, they are then subjected to the next finishing processes. All these finishing processes are effected as the bobbin holding pins 7 remain downwardly directed.

During the coil finishing processes, if any coil bobbin 2, is determined to be defective by the sensor section 77 of the defective discriminating device 76, the coil bobbin is then moved to the front of the defective discharging mechanism 78 by the control of a control device, not shown. At this time, as shown in FIG. 9, a discharging bar 78*a*, provided in the defective discharging mechanism 78, is inserted into the gap between the tip of the bobbin discharging plate 62 of the finger unit 21 and the flange of the coil bobbin 2 that has been determined to be defective, and then the bobbin holding pin 7 and the bobbin discharging plate 62 are retracted upward, whereby the coil bobbin 2 is released from the state of being held, and allowed to drop.

Finally, when all the processes have been completed, and it is required to discharge the coil bobbins 2 from the machine, the coil bobbins 2 held by the finger unit 21 are moved by the second shuttle 20 to a predetermined position above the pallet 81 disposed on the bobbin discharging pallet conveying device 80. Subsequently, as shown in FIG. 10, the bobbin discharging plate 62 alone is advanced downward, thereby allowing the coil bobbins 2 to drop off from the bobbin holding pins 6, then to be arranged at predetermined positions provided in lines on the pallet 81.

As described above, all the transferring operations of the coil bobbins 2 between the various devices can be effected by the first and second shuttles in cooperation with the devices, thereby eliminating the need for robots, which have been conventionally used.

Next, an explanation will be made with reference to FIGS. 11(*a*), 11(*b*), 11(*c*) and 11(*d*). One of the main features of the embodiment of the automatic coil winding and finishing machine of the present invention is the manner in which all the coil bobbins 2 held by the finger unit 11 of the first shuttle 1 are transferred to the finger unit 21 of the second shuttle 20 and then held thereby. The coil bobbins 2 are transferred in such a manner that the intervals between them are reduced.

The bobbin holding pins 7 of the finger unit 21 of the second shuttle 20 form groups of pins, each group comprising, for instance, pins *7a*, *7b*, *7c* and *7d*. On the other hand, the bobbin holding pins 6 of the finger unit 11 of the first shuttle 10 form groups of pins, each group comprising, for instance, pins 6*a*, 6*b*, 6*c*, or 6*d*. FIG. 11(*a*) illustrates the state in which the finger unit 11 has been moved to a position at which the bobbin holding pins 6*a* forming the group that is closest to one end of the finger unit 11 on one side thereof are exactly aligned with the bobbin holding pins *7a* that are each the closest in each group to the end of each group that is on the same side as that group of pins 6*a*. With this position, the pins *7a* are each positioned in front of the group of pins 6*a*, the group being the closest to that end being discussed, and comprising, e.g., three pins.

In the example illustrated in FIGS. 11(*a*) through 11(*d*), each interval between adjacent pins 7 is set to one quarter of that between adjacent pins 6*a*. The pins *7a* therefore correspond to the every fourth ones of the pins 7.

Also in the illustrated example, three pins 6 form one group from which three coil bobbins 2 held thereby can be simultaneously discharged by the movement of one bobbin discharging plate 42*a*, 42*b*, 42*c* or 42*d*.

With the state shown in FIG. 11(*a*), therefore, three bobbins 2 in the first group can be simultaneously transferred from the finger unit 11 to the finger unit 21 in the manner described before with reference to FIGS. 7(*a*) through 7(*d*).

Subsequently, as shown in FIG. 11(*b*), the finger unit 11 is further moved to a position at which three pins 6*b* forming the second group are exactly in front of the pins *7b* that are each adjacent to the pins *7a*. In this state, three coil bobbins 2 held by the three pins 6*b* are simultaneously transferred to the finger unit 21, in the manner described before with reference to FIGS. 7(*a*) through 7(*d*).

Subsequently, as shown in FIG. 11(*c*), the finger unit 11 is further moved to a position at which three pins 6*c* forming the third group are exactly in front of the pins *7c* that are each adjacent to the pins *7b*. In this state, three coil bobbins 2 held by the three pins 6*c* are simultaneously transferred to the finger unit 21.

Finally, as shown in FIG. 11(*d*), the finger unit 11 is further moved to a position at which three pins 6*d* forming the fourth group are exactly in front of the pins 7*d* that are each adjacent to the pins 7*c*. In this state, three coil bobbins 2 held by the three pins 6*d* are simultaneously transferred to the finger unit 21.

In this way, all the coil bobbins 2 held by the finger unit 11 can be transferred to the finger unit 21 in which the coil bobbin holding intervals are much narrower than those in the finger unit 11.

The embodiment of the automatic coil winding and finishing machine of the present invention also has a coil winding device including a wire feeder and guides, and various devices for coil finishing processes such as soldering, cleaning, drying, defective discriminating, and defective discharging. However, the descriptions of these devices will be omitted because their constructions may be the same as those of known arts or combinations thereof.

It should be noted, however, the apparatus has an electronic control device, not shown, which incorporates therein a computer for controlling all the operations of the abovementioned devices and the first and second shuttles including the finger units.

In the above-described embodiment, twelve coil bobbins 2 are transferred from the finger unit 11 of the first shuttle 10 to the finger unit 21 of the second unit 21 by effecting four transferring operations, as shown in FIGS. 1, 2, 4, and FIGS. 11(*a*) through 11(*d*). However, the number of the entire coil bobbins, the number iof coil bobbins simultaneously transferred by each operation may be selected from various other combinations.

As has been described above in detail, according to the present invention, two shuttles are provided as first and second bobbin conveying devices for horizontally moving coil bobbins. Coil bobbins are transferred from a parts feeder to the first shuttle, then from the first shuttle to a coil winding device. When coils have been wound on the coil bobbins, the coil bobbins are transferred from the coil winding device to the first shuttle, and then from the first shuttle to the second shuttle. The coil bobbins are then subjected to coil finishing processes as they remain held by the second shuttle. Therefore, the transferring of the coil bobbins requires no intervention of robots, thereby enabling the automatic control of all the coil winding process and the coil finishing processes to be continuously performed smoothly and in a simple manner.

Further, because no extra space is required to instal robots, and because the devices for the coil finishing processes can be arranged linearly along the second shuttle over the minimum distance, the coil winding device and the coil finishing devices can be arranged together within a narrow space.

Still further, the intervals at which the shuttles hold coil bobbins may be such that the intervals in the second shuttle for the coil finishing processes are much narrower than those in the first shuttle for transferring coil bobbins to and from the coil winding device. Therefore, each of the devices for the coil finishing processes can be made small, and disposed close to one another. This advantage, together with the advantage in which the transferring of the coil bobbins does not necessitate the installation of any exclusive machines, makes it possible to arrange the coil winding device and the coil finishing devices within a very narrow space.

Still further, certain processes the efficiency of which tends to be influenced by the structure of the solder bath, the cleaning bath, etc. are allowed to process a large number of coil bobbins at one time. Therefore, it is possible to achieve reduction in the work hours and so forth required, providing great advantageous in terms of production efficiency.

What is claimed is:

1. An automatic coil winding and finishing machine comprising:

a first bobbin conveying device for moving coil bobbins;

a feeding device disposed in parallel with said first bobbin conveying device for lining said coil bobbins and then feeding said bobbins to said first bobbin conveying device;

a coil winding device for receiving said coil bobbins from said first bobbin conveying device and then winding coils on said coil bobbins;

a second bobbin conveying device for moving said coil bobbins;

devices for coil finishing processes which are disposed in parallel with said second bobbin conveying device; and an electronic control device for controlling at least said first bobbin conveying device, said second bobbin conveying device, said coil winding device, and said devices for the coil finishing processes in such a manner that they operate in synchronization;

wherein, in order to automatically and continuously effect a series of processes including the coil winding process and the coil finishing processes, said feeding device, said first bobbin conveying device, said coil winding device, said second bobbin conveying device, and said devices for the coil finishing processes are disposed at positions such that, when said coil bobbins have been fed from said feeding device to said first bobbin conveying device and then moved to a predetermined position on said first bobbin conveying device, said coil bobbins are transferred from said first bobbin conveying device to said coil winding device; when said coil bobbins have been subjected to the coil winding process, said coil bobbins are again transferred to said first bobbin conveying device; when said coil bobbins have been moved to another predetermined position on said first bobbin conveying device, said coil bobbins are transferred from said first bobbin conveying device to said second bobbin conveying device; and, when said coil bobbins have been moved to predetermined positions on said second bobbin conveying device, said coil bobbins are subjected to predetermined processes by said devices for the coil finishing processes.

2. An automatic coil winding and finishing machine according to claim 1, wherein said first bobbin conveying device and said second bobbin conveying device each comprises:

a mechanism for converting through 90 degrees the attitude of a coil bobbin holding structure so that said coil bobbin holding structure can hold coil bobbins with the central axis of said coil bobbins being switched between the horizontal and vertical directions;

a mechanism for moving said coil bobbin holding structure in the horizontal direction normal to the central axis of said coil bobbins held by said coil bobbin holding structure;

a mechanism for advancing or retracting said coil bobbins held by said coil bobbin holding structure in the direction of the central axis of said coil bobbins; and a mechanism for discharging said coil bobbins from said coil bobbin holding structure.

3. An automatic coil winding and finishing machine according to claim 2, wherein, when the coil bobbins on which the coils have been formed are transferred from said first bobbin conveying device to said second bobbin conveying device, the intervals at which said coil bobbins are to be held by said second bobbin conveying device are changed relative to intervals at which said coil bobbins are held by said first bobbin conveying device, so that all said coil bobbins on which the coils are formed can be transferrd to said second bobbin conveying device by effecting a plurality of transferring operations, each time causing a certain number of coil bobbins among a plurality of groups of coil bobbins held in line by said first bobbin conveying device and across a certain span to be transferred.

* * * * *